(12) United States Patent
Golin et al.

(10) Patent No.: US 6,754,270 B1
(45) Date of Patent: Jun. 22, 2004

(54) ENCODING HIGH-DEFINITION VIDEO USING OVERLAPPING PANELS

(75) Inventors: Stuart J. Golin, Piscataway, NJ (US); Agesino Primatic, Jr., Frenchtown, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 708 days.

(21) Appl. No.: 09/676,063

(22) Filed: Sep. 29, 2000

(51) Int. Cl.[7] .............................. H04N 7/12; H04N 9/74; G06K 9/32

(52) U.S. Cl. ..................... 375/240.12; 375/240.24; 348/584; 382/298

(58) Field of Search .................................. 348/584, 469, 348/487, 385.1, 470, 432.1, 598; 375/240.1, 240.12, 240.16, 240.24; 382/298

(56) References Cited

U.S. PATENT DOCUMENTS

| | | | | | |
|---|---|---|---|---|---|
| 4,979,020 | A | * | 12/1990 | Isnardi | 348/433.1 |
| 5,032,917 | A | * | 7/1991 | Aschwanden | 348/598 |
| 5,128,747 | A | * | 7/1992 | Isnardi et al. | 348/470 |
| 5,128,761 | A | * | 7/1992 | Basile et al. | 348/385.1 |
| 5,146,844 | A | * | 9/1992 | Dubowik et al. | 99/450.6 |
| 5,247,351 | A | * | 9/1993 | Cho | 348/487 |
| 5,640,210 | A | * | 6/1997 | Knee et al. | 348/469 |
| 5,801,778 | A | | 9/1998 | Ju | 348/416 |
| 5,883,679 | A | | 3/1999 | Iskarous et al. | 349/699 |
| 6,058,143 | A | | 5/2000 | Golin | 375/240 |
| 6,356,589 | B1 | * | 3/2002 | Gebler et al. | 375/240.1 |
| 6,573,945 | B1 | * | 6/2003 | Wu et al. | 348/584 |

OTHER PUBLICATIONS

Bahl, et al., "Software-only Compression, Rendering, and Playback of Digital Video", Digital Tech. J. Apr. 1996, available at http://www.digital.com/DT JK04/.

Drury, et al., "Aspects of Digital HDTV Coding," SMPTE J., Feb. 2000, pp. 102–113.

* cited by examiner

*Primary Examiner*—Gims Philippe

(57) ABSTRACT

In encoding high-definition video signals, the method includes overlapping panels with a single row in the overlap, selecting the better-encoded one of the rows in the overlap, removing the unselected row, and merging bit streams from the panels. In deciding which one of the rows in the overlap is better encoded, a heuristic approach may be used, for example, a panel with the fewer bits, or with fewer errors or the panel as suggested by the motion vectors. Optionally, panels may be synchronized by copying the selected row in the overlap in place of the unselected row in the overlap.

19 Claims, 6 Drawing Sheets

ENCODING HIGH-DEFINITION VIDEO USING OVERLAPPING PANELS

TECHNICAL FIELD

The present invention is related in general to methods of encoding video signals, and in particular, to a method of encoding high-definition video signals using overlapping panels.

BACKGROUND

As with all digital communication systems, in the case of television signals, compression and decompression techniques are important in reducing the amount of digital data that must be transmitted. The International Standards Organization—Moving Picture Experts Group (ISO—MPEG) proposed an international standard for encoding and decoding digital video data. This standard has been described in ISO/IEC 13818-2 "Generic Coding of Moving Pictures and Associated Audio Information: Video", and ATSC document A/54 "Guide to the Use of the ATSC Digital Television Standard" and defines a system commonly known as MPEG-2. MPEG-2 achieves data compression by encoding digital video data as a series of code words in a complex scheme resulting in a reduction in the average length of the code words compared to other methods. The MPEG-2 standard allows for encoding high-resolution video images, known as High Definition Television (HDTV).

A common technique known as prediction is typically used in video compression systems. To reduce the amount of data to be transmitted, some predictable or redundant property of a picture data is identified, and the property can be exploited to predict the data to be transmitted. Prediction is performed in combination with entropy coding, differential coding etc. MPEG uses a particularly powerful prediction scheme involving motion-compensated prediction from previous and/or subsequent frames. In motion-estimation, the encoder searches for a portion of a previous frame, which is similar to the part of the new frame to be transmitted. It then sends (as side information) a motion vector telling the decoder what portion of the previous frame it will use to predict the new frame. It also sends the prediction error so that the frame may be reconstituted with good quality. It should be noted, however, that an accurate estimation of object motion is not essential—any part of the previous frame that is similar to the current frame would be helpful.

In some cases, certain information may be unpredictable from a previous frame. For example, in a start-up condition, or in the case of a change of scene, a non-differential frame must be encoded, thereby requiring more data than for predicted frames. In MPEG, these are called intra-coded or "I" pictures. Other situations where information may be unpredictable from a previous frame include newly uncovered information due to object motion across a background, or at the edges of a panned scene. MPEG achieves a reduction in transmitted data by sending a bi-directionally encoded picture, or "B" picture.

After analog video signals are digitized (or when a device such as a digital camera generates a video signal in a digital form), the digital data is organized into basic units of motion compensation. According to MPEG-2, pictures are made up of pixels. A block is an 8×8 array of pixels. A macroblock is a 16×16 array of pixels or a 2×2 array of luminance blocks (it also contains 2, 4 or 8 chrominance blocks) and is the finest level of granularity into which a frame can be divided for motion compensation. Each macroblock is a unit of motion compensation and adaptive quantization. A macroblock defines a predetermined spatial region in a picture, and contains luminance and chrominance information. MPEG provides for the arrangement of macroblocks into slices. A slice, which is of a medium level of granularity, is an integer number of consecutive macroblocks from a raster of macroblocks. Further levels of granularity include frame and Group of Pictures.

While MPEG compression encodes motion vectors on a macroblock basis, no technique is specified as to how to compute motion vectors. Thus, a variety of different motion estimation techniques can be implemented consistent with the MPEG standard.

The conceptually simplest way to compute motion vectors is to search a "reference" image to find the 16×16 area with the best match to the current macroblock. A common measure of the match is the sum of the absolute differences between corresponding pixels in the two blocks—the smaller the sum, the better. The search range is often the largest permitted by the hardware, and is usually centered at the same position as the current macroblock. This approach evaluates the match for every pixel displacement in that range. The search can then be refined by interpolation to half-integer resolution.

Another technique, for example, is to compute motion vectors from the frame-to-frame correlation of blocks of pixels in the luminance signal, resulting in a motion vector for the luminance component of the macroblock.

SUMMARY

It has been discovered that overlapping panels by a single row improves the state of the art by reducing the encoder complexity. The row in the overlap may be subdivided into multiple slices. Furthermore, whether to use the encoding from the upper or lower panel could be decided by a heuristic approach disclosed herein. In one aspect, the row (in the overlap) can be split into multiple subdivisions, so that this decision—of which encoding to use—can be made at a finer level of granularity.

Additionally, macroblocks in the overlap region are encoded twice. Considering the case of an overlap, the encoding of the upper panel would include an encoding of the row in the overlap. Likewise, the lower panel would include the encoding of the row in the overlap. After encoding, these encoded panels are typically synchronized, so that they both have the same reconstruction for the row in the overlap. Thus, in a preferred embodiment, the reconstructed picture is synchronized. This synchronization step is not necessary for B-pictures because they are not used to predict other pictures.

Advantageously, according to the disclosed method, the synchronization step can be bypassed, thereby further reducing the encoder complexity. While bypassing the synchronization step may introduce some error, it is discovered that for high quality coding, little difference exists between two reconstructions of the macroblocks in the overlap.

BRIEF DESCRIPTION OF THE DRAWINGS

These and other features, objects and advantages of the present invention can be readily understood from the following detailed description and the appended claims with a reference to the accompanying drawings, where like numbers designate like parts, and wherein:

DETAILED DESCRIPTION

The invented principles are described herein with respect to encoding digital high-definition television signals. Though the illustrative embodiment uses a particular standard, it should be understood that the principles disclosed herein are applicable to encoding other types of signals.

Figure 1:
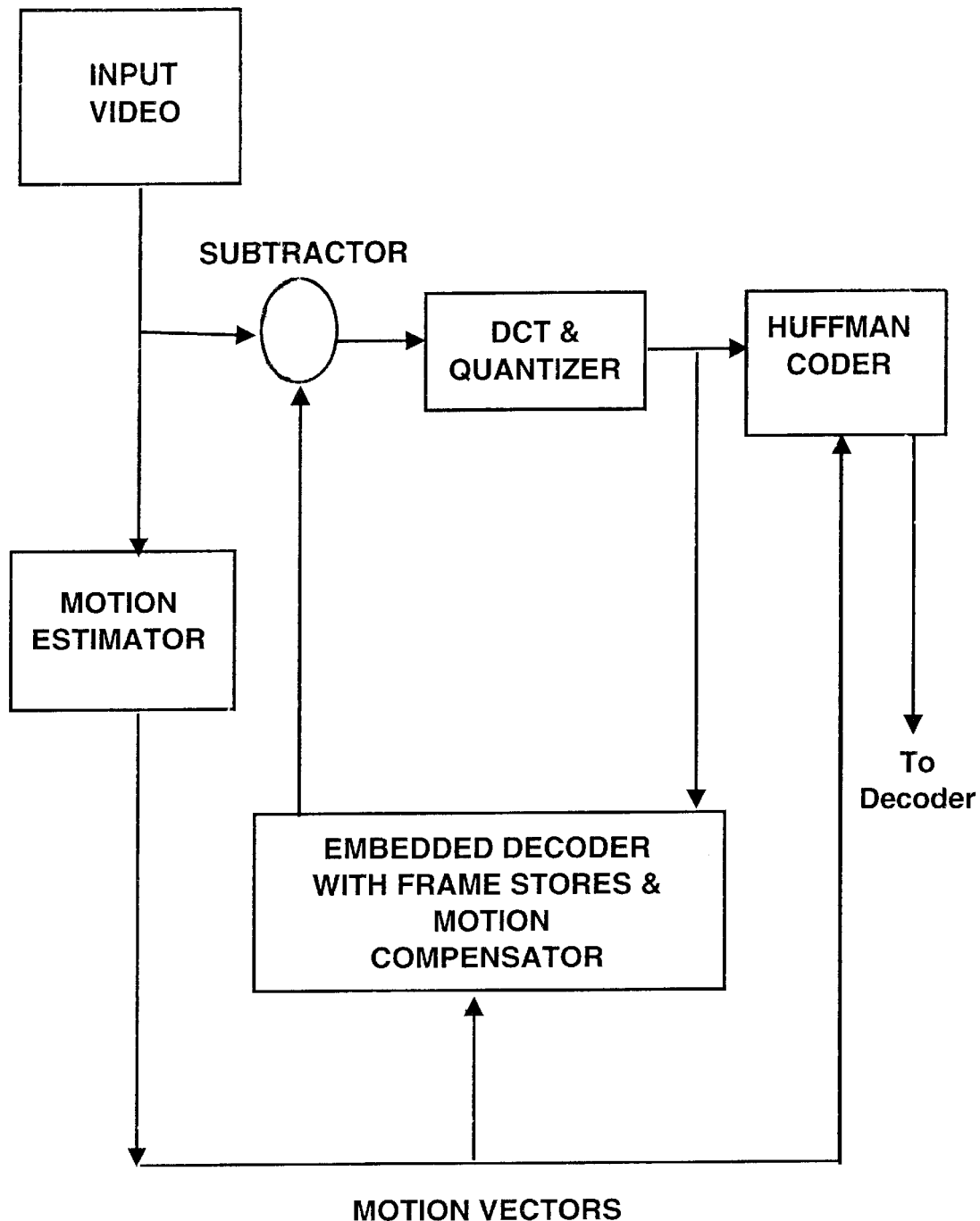
FIG. 1 is a block diagram of an illustrative MPEG encoder.

Referring now to the drawings, FIG. 1 shows an illustrative MPEG encoder using P- and B-pictures, which are encoded as follows. Data representing macroblocks of pixel values for a picture to be encoded are fed to both the subtractor and the motion estimator. The motion estimator compares each of these new macroblocks with macroblocks in a previously stored reference picture or pictures and determines the 16×16 area in the reference picture that most closely matches the new macroblock. The motion estimator then calculates a motion vector, which represents the horizontal and vertical displacement from the macroblock being encoded to the matching macroblock-sized area in the reference picture. The motion estimator also reads this matching macroblock—known as a "predicted" macroblock—out of the reference picture memory and sends it to the subtractor, which subtracts it, on a pixel-by-pixel basis, from the new macroblock entering the encoder. This forms an error prediction or residual signal that represents the difference between the predicted macroblock and the actual macroblock being encoded. This residual is often very small. The residual is transformed from the spatial domain by a 2-dimensional Discrete Cosine Transform (DCT). The DCT coefficients of the residual are then quantized in a process that reduces the number of bits needed to represent each coefficient. The quantized DCT coefficients are Huffman run/level coded which further reduces the average number of bits per coefficient. This is combined with motion vector data and other side information (including an indication of I, P or B picture) and sent to the decoder.

For P-pictures, the quantized DCT coefficients also go to an embedded decoder. The residual is inverse quantized and inverse DCT transformed. The predicted macroblock read out of the reference picture memory is added back to the residual on a pixel-by-pixel basis and stored back into memory to serve as a reference for predicting subsequent pictures. Thus the data in the reference picture memory of the encoder is made to match the data in the reference picture memory of the decoder. B-pictures are typically not stored as reference pictures. I-pictures are encoded in the same way, except that there is no motion estimation. Thus, the quantized DCT coefficients represent transformed pixel values rather than residual values, as was the case for P- and B-pictures. As is the case for P-pictures, decoded I-pictures are stored as reference pictures.

Figure 2A:
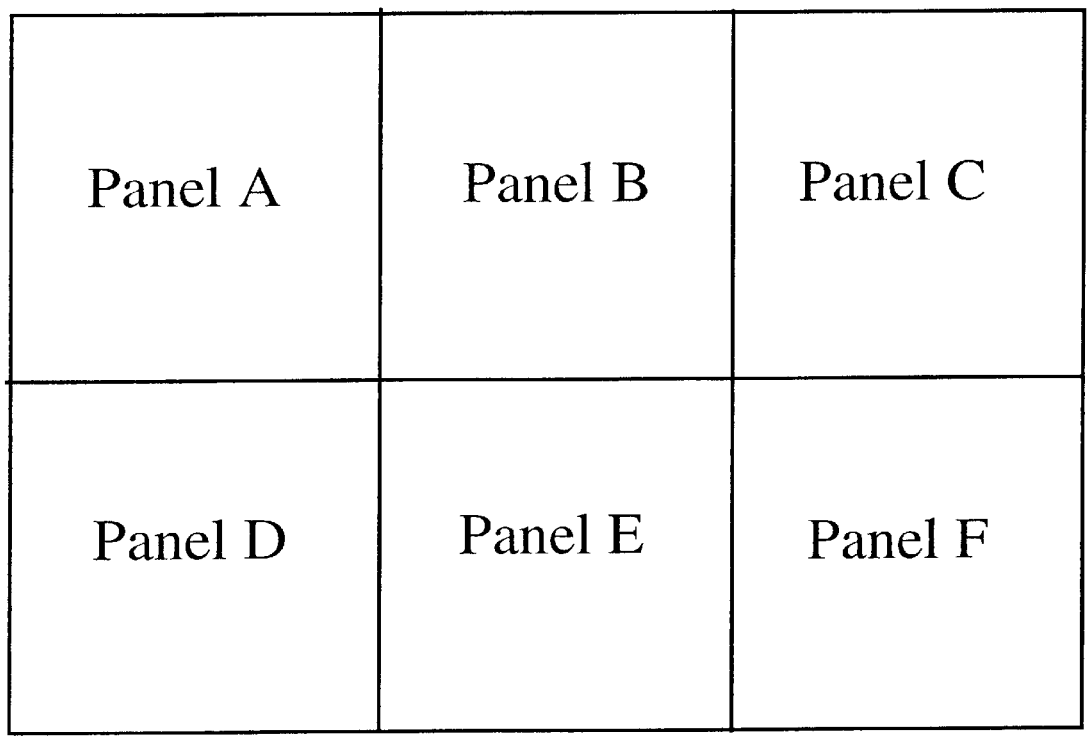
FIGS. 2(a)–(b) show different ways in which exemplary frame could be divided into six panels.
Figure 2B:
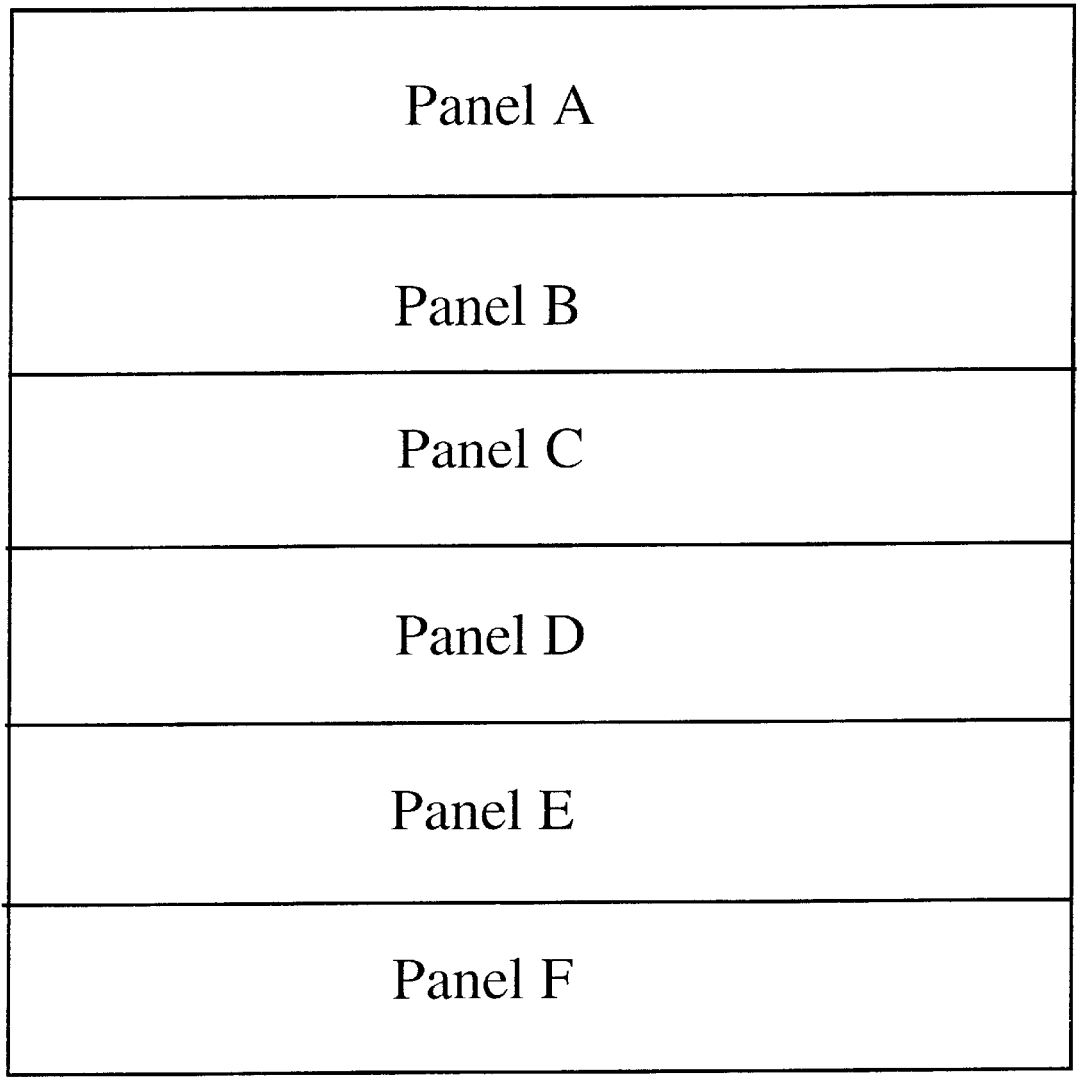

Referring to FIGS. 2(a) and 2(b), when coding digital HDTV signals, a frame or a picture is sometimes subdivided into panels A, B, C, D, E and F so that each panel could be separately encoded. Suitably, each of these panels is designed to be within the capability of a single coder chip. This subdivision, rather than a subdivision such as a slice or other smaller MPEG data structures, provides for a better compression performance. Data at the boundaries of panels are sometimes poorly encoded. This could be because data at the boundaries may contain image information that is best predicted from other panels. Poor encoding hurts picture quality at panel boundaries and may also result in wastage of bits. It should be noted that these panels may be tiled horizontally—as shown by panels A, B and C in FIG. 2(a)—or vertically—as shown by panels A–F in FIG. 2(b).

Figure 2C:
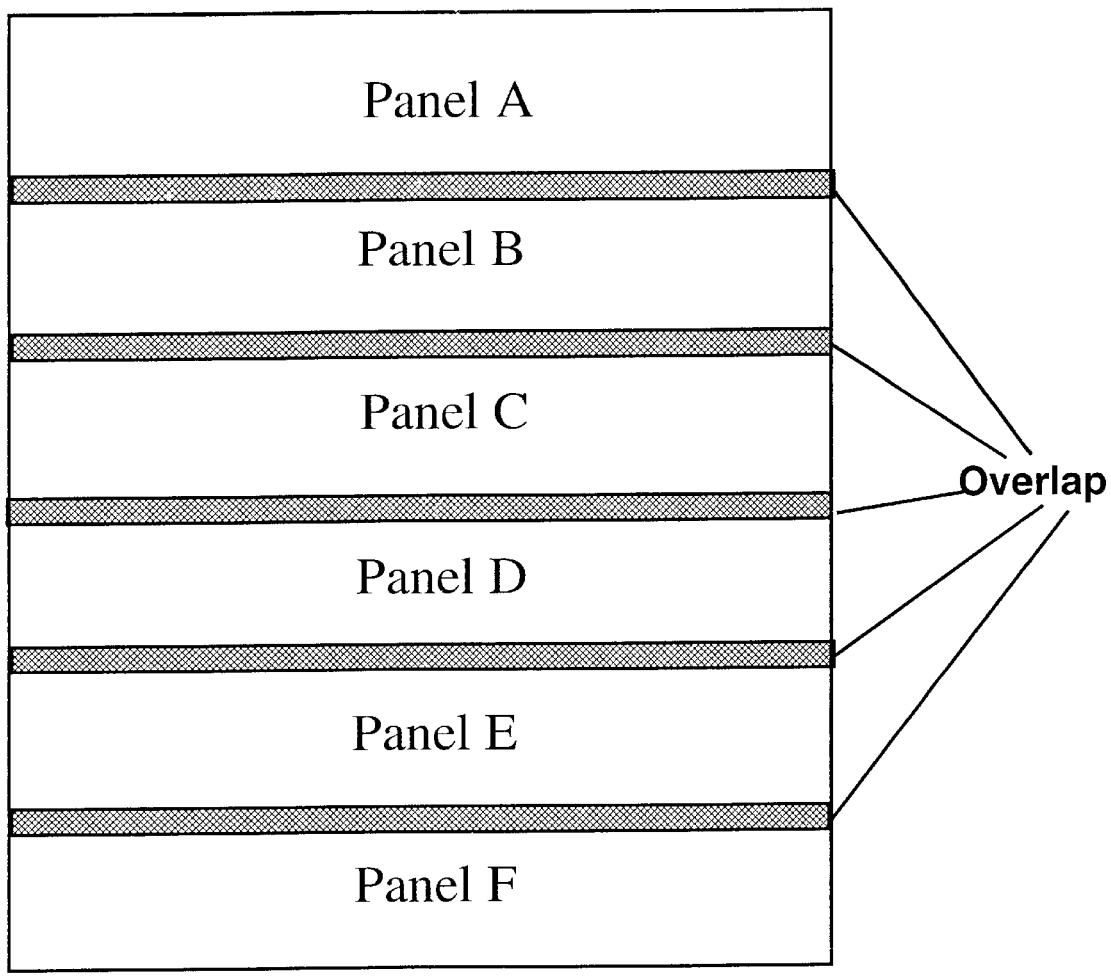
FIG. 2(c) depicts an exemplary frame with overlapping panels.

Referring to FIG. 2(c), one method to solve the above problem is to overlap these panels to certain extent such that panels in the overlap can share imagery. Systems that provide for such sharing typically use at least two rows of macroblocks in the overlap.

Figure 3:
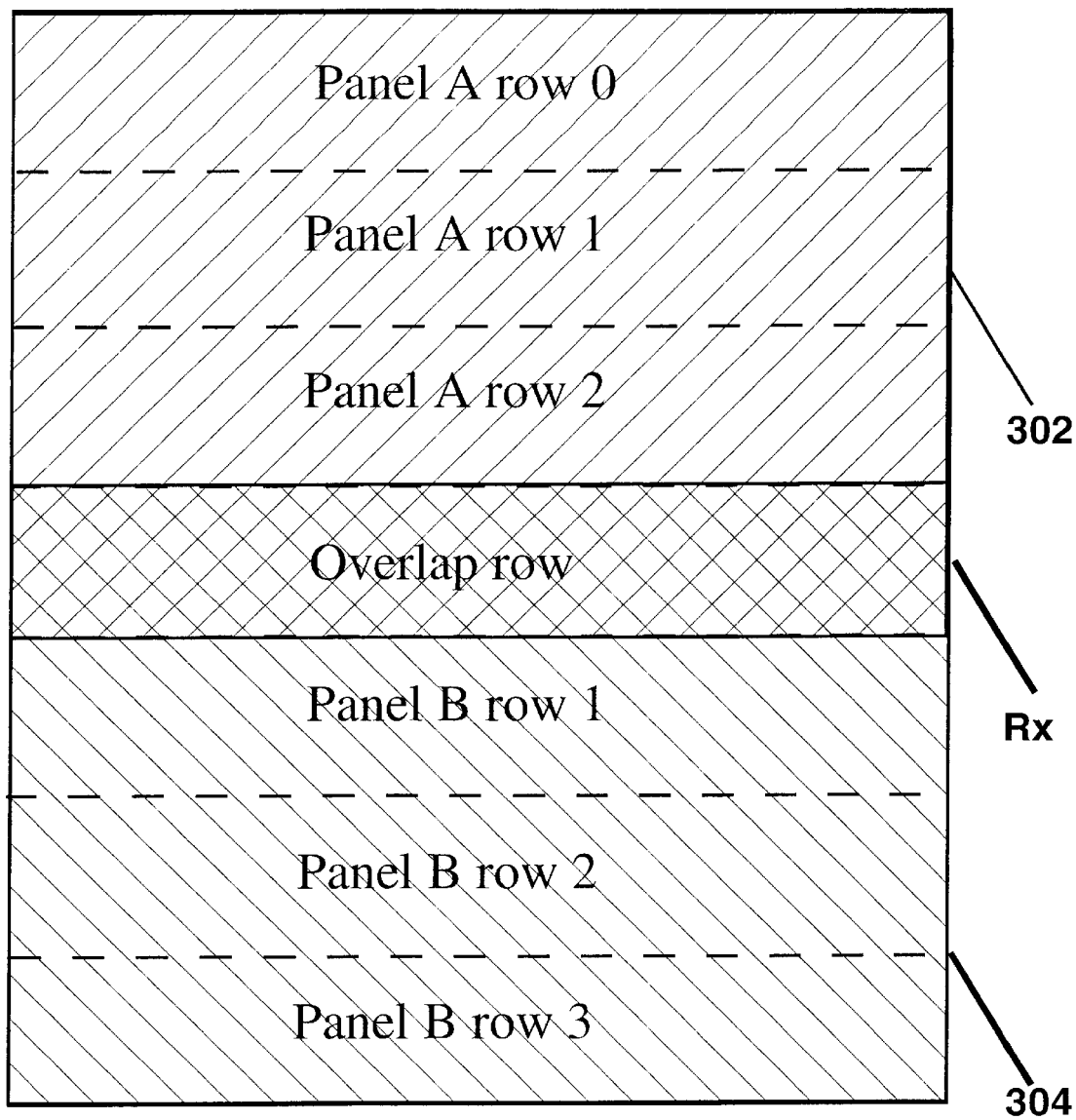
FIG. 3 depicts an illustration of two panels overlapped by a single row in the overlap region.

Referring to FIG. 3, consider, as an example, an image with 7 rows of macroblocks. Let us suppose that the image is divided into two panels, a first panel 302 and a second panel 304. These panels could be, for example, panels A and B shown in FIG. 2(c). The first panel 302 and the second panel 304 overlap by only one row, Rx.

Separately Encoding Each Panel in the Overlap

Figure 4:
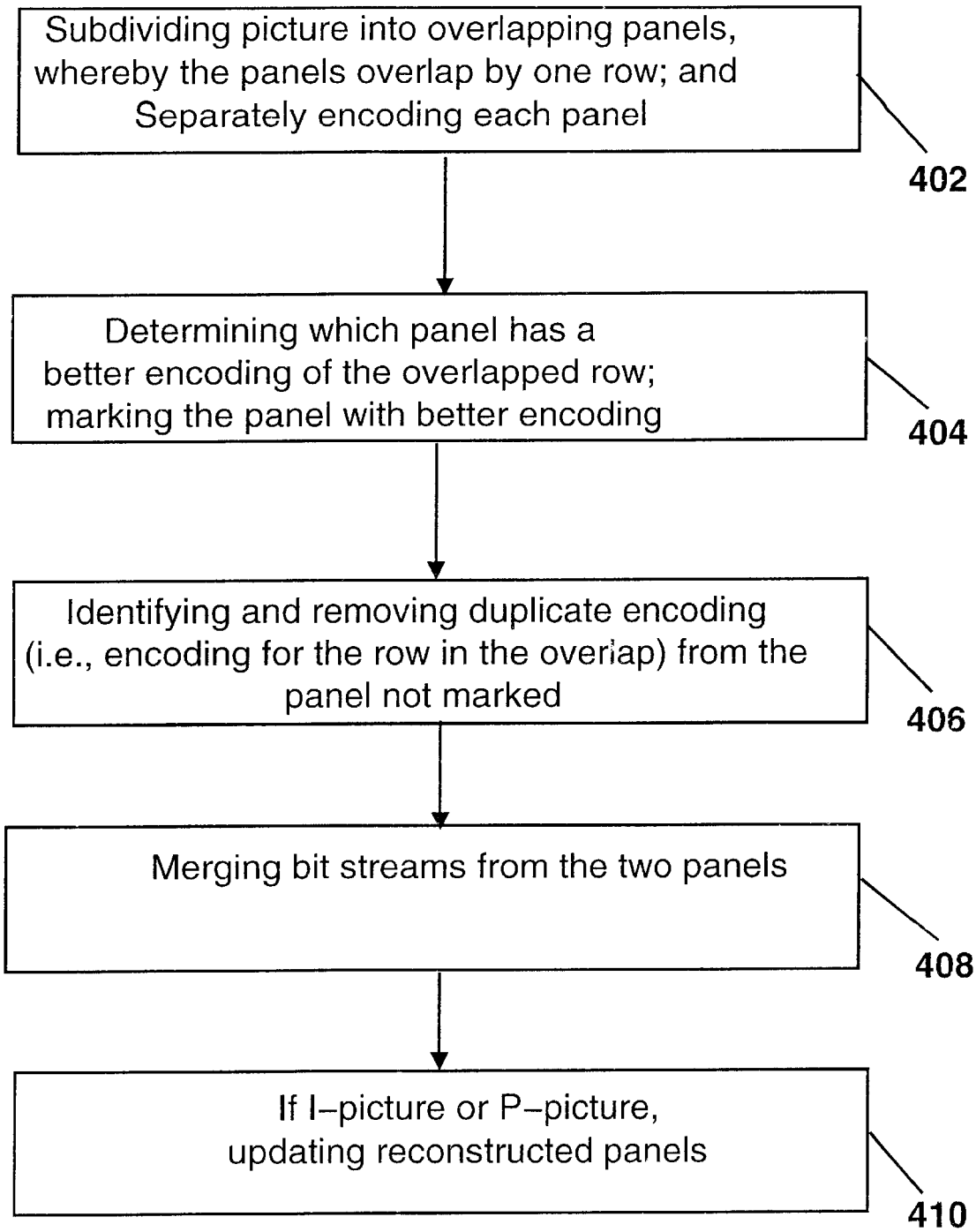
FIG. 4 is a flow diagram depicting steps in an illustrative embodiment according to which the present invention may be practiced.

Referring to FIG. 4 the panels are encoded separately using an encoding process such as the one described above (step 402). Because of the separate encoding, row Rx, which is the overlap row, is encoded twice—once when the first panel 302 is encoded, and again when the second panel 304 is encoded.

Determining Which Panel in the Overlap Has Better Encoding

The next step is to determine which panel in the overlap has better encoding for the row Rx (step 404). Once this is determined, it will be possible to keep the better encoding, and to reject the other. At least three alternative heuristic approaches could be used to make this determination. They are (1) selecting the encoding of Rx that has the fewest bits; (2) selecting the encoding of Rx that has the least error; or (3) selecting the panel suggested by the motion vectors.

The selection of the better-encoded panel based on the motion vectors is accomplished as follows. As stated earlier, MPEG requires motion vectors for macroblocks, which are 16×16 blocks that tile an image. The vertical component of the motion vectors may indicate which panel has the better encoding. Motion vectors by convention point to the source of the imagery rather than in the direction of the actual motion. Thus, the motion vectors may point up if an image is moving downward. If this is the case, the upper panel will have the better encoding, because the top row of the lower panel cannot point up—to do so, they would reference the other panel. A clue to this is that the vertical component of macroblocks in this row would be either zero, or they have the opposite sign of most other macroblocks in the lower panel. The bottom row of the top panel does not have this problem—its vectors can point up.

Because it is likely that the encoding in one panel 302 or 304 is optimal for only a part of a row, it is desirable to base the selection on a finer scale. This can be done by encoding each row with two or more slices, and by optimizing each slice separately.

Eliminating Duplicate Encoding

If it is determined that the bottom panel has the better encoding of Rx, the next step is to identify and remove the last row in the first panel 302 (step 406). It is noted that each row begins with a new slice, and each slice begins with a byte-aligned slice start code (SSC). Furthermore, the SSC tells the row in which it occurs. Thus, in an embodiment, searching for the first SSC indicating Rx can identify the last row Rx of the first panel 302. This location provides the new end of encoding for the first panel 302.

A second approach to determining the last row in the first panel 302 can be devised based on the number of bits in the first panel's encoding, which is a known quantity. A heuristic approach to determine this includes going to the end of the bit stream (for the first panel 302), and searching backwards for a slice in the row Rx.

Since a row may contain more than one slice, it is important to find the first slice. There are two ways to do this. One can overshoot, and then go forward. Alternatively, one can decode the first macroblock of a slice, which indicates its horizontal position.

As with the case of the second panel 304 having better encoding of row Rx than the first panel 302, so also, it could be the case that the first panel 302 has the better encoding of row Rx than the second panel 304. In this case, the encoding of Rx from the second panel 304 must be rejected. By simply searching the bit stream for the second panel 304 until the first SSC for the next row after Rx, e.g., Rx+1, one could determine the new start of that bit stream.

Merging Bit Streams from the Two Panels

The next step is to merge bit streams from the two panels 302 and 304 (step 408). In case where the selection of the panel with better encoding is made with granularity finer than that of a row, the merging is slightly more complicated, but not fundamentally different. This is done in two sub-steps: (a) encoding each row, as stated above, with two or more slices, and (b) optimizing each slice separately.

Updating Reconstructed Panels

If the picture is an I-picture or a P-picture, one must update the reconstructed (step 410). If, for example, encoding of Rx from the second panel 304 is selected, he reconstruction of the first panel 302 is incorrect in that it is different from what coder sees. Therefore one should copy the second panel 304's reconstruction of row Rx over that of the first panel 302.

At high bit rates, the reconstructed images are found to be close to the original, ting that one might bypass this copying step, resulting in an approximation. This approximation may introduce a few errors, but will result in reduced hardware complexity.

Pseudocode for a Two-panel Single-row Overlap

Table 1 depicts illustrative pseudo-code of the heuristic algorithm for a two-panel single-row overlap.

TABLE 1

```
BEGIN
  Divide video into two panels, a first panel and a second panel that
  overlap by one row Rx.
  LOOP
    FOR EACH PICTURE
      Encode the first panel and the second panel.
      Determine a panel Px that has better encoding of the row Rx.
      Let this panel Px be a marked panel; the unmarked panel is Nx.
      Remove encoding of Rx from the unmarked panel, i.e., from Nx.
      Merge the encodings from the first panel and the second panel.
```

TABLE 1-continued

```
      IF {(I-Picture) or (P-Picture) }
      THEN
        Reconstruct panels Px and Nx.
        Copy reconstruction of row Rx from panel Px to panel Nx.
      ENDIF
    END LOOP
END
```

The foregoing describes a method of encoding high-definition video signals using overlapping panels. The prior art methods required coding twice as much extra area to achieve the same effect as the present invention. Unlike in the case of prior art methods, in the instant case, the association of each row with a particular panel is not predetermined. Thus, if n rows were to be able to point beyond a boundary, the prior art s required an overlap of 2n rows; the present invention achieves it with only n=1. In other words, for any given degree of overlap, the present method results in twice the extended range of motion vectors as provided by the prior art methods. Persons skilled in the art may make several modifications, arrangements, and enhancements without significantly departing from the spirit and scope of the present disclosure or without undue experimentation. For example, the panels could be horizontally or vertically or both horizontally and vertically tiled; the order of the steps followed during the encoding or the decoding process may be altered; or a finer granularity than a row—such as a macroblock—may be used to perform encoding or decoding. Also, the overlap region can consist of multiple rows. Accordingly, all such departures should properly be understood to be within the scope and meaning of the following claims.

What is claimed is:

1. A method of encoding high definition video using overlapping panels, comprising the steps of:

causing a first panel and a second panel to overlap by a single row thereby forming an overlapped row;

separately encoding the first panel and the second panel;

determining whether the overlapped row is better encoded in the first panel or the second panel;

marking the panel with better encoding of the overlapped row;

removing redundant encoding of the overlapped row from the panel that is not marked; and merging bit streams from the first panel and the second panel.

2. The method of claim 1, further comprising the step of:

if the video is encoded as a P-picture or an I-picture, optionally copying reconstruction of the overlapped row from the marked panel to the panel not marked.

3. The method of claim 1, wherein the step of determining whether the overlapped row is better encoded in the first panel or the second panel comprises the step of:

selecting a panel with fewer bits.

4. The method of claim 1, wherein the step of determining whether the overlapped row is better encoded in the first panel or the second panel comprises the step of:

selecting a panel with fewer errors.

5. The method of claim 1, wherein the step of determining whether the overlapped row is better encoded in the first panel or the second panel comprises the step of:

selecting a panel as suggested by a motion vector.

6. The method of claim 1, wherein the step of removing redundant encoding from the panel that is not marked further comprises the step of:

searching, in the panel not marked, a slice start code to determine for the overlapped row.

7. The method of claim 1, wherein the step of removing redundant encoding from the panel that is not marked further comprises the step of:

searching, in the panel not marked, from an end of a bit stream for a slice in the overlapped row.

8. The method of claim 7, wherein the step of searching comprises the step of:

overshooting and going forward.

9. The method of claim 7, wherein the step of searching comprises the step of:

decoding a first macroblock of a slice to determine its horizontal position.

10. A method of encoding high definition video using overlapping panels, comprising the steps of:

causing a first panel and a second panel to overlap by a single row of macroblocks thereby forming an overlapped row of macroblocks;

separately encoding the first panel and the second panel;

determining whether the overlapped row of macroblocks is better encoded in the first panel or the second panel;

marking the panel with better encoding of the overlapped row of macroblocks;

removing redundant encoding of the overlapped row of macroblocks from the panel that is not marked; and merging bit streams from the first panel and the second panel.

11. The method of claim 10, further comprising the step of:

if the video is encoded as a P-picture or an I-picture, optionally copying reconstruction of the overlapped row from the marked panel to the panel not marked.

12. The method of claim 10, wherein the step of determining whether the overlapped row is better encoded in the first panel or the second panel comprises the step of:

selecting a panel with fewer bits.

13. The method of claim 10, wherein the step of determining whether the overlapped row is better encoded in the first panel or the second panel comprises the step of:

selecting a panel with fewer errors.

14. The method of claim 10, wherein the step of determining whether the overlapped row is better encoded in the first panel or the second panel comprises the step of:

selecting a panel as suggested by a motion vector.

15. The method of claim 10, wherein the step of removing redundant encoding from the panel that is not marked further comprises the step of:

searching, in the panel not marked, a slice start code to determine for the overlapped row.

16. The method of claim 10, wherein the step of removing redundant encoding from the panel that is not marked further comprises the step of:

searching, in the panel not marked, from an end of a bit stream for a slice in the overlapped row.

17. The method of claim 16, wherein the step of searching comprises the step of:

overshooting and going forward.

18. The method of claim 16, wherein the step of searching comprises the step of:

decoding a first macroblock of a slice to determine its horizontal position.

19. A method of encoding high definition video using overlapping panels, comprising the steps of:

causing a first panel and a second panel to overlap by a single row of slices thereby forming an overlapped row of slices;

separately encoding the first panel and the second panel;

determining whether the overlapped row of slices is better encoded in the first panel or the second panel;

marking the panel with better encoding of the overlapped row of slices;

removing redundant encoding of the overlapped row of slices from the panel that is not marked; and merging bit streams from the first panel and the second panel.

* * * * *